W. MARTIN.
CONTINUOUS WINDOW GLASS DRAWING MACHINE.
APPLICATION FILED SEPT. 20, 1909.
969,385.
Patented Sept. 6, 1910.
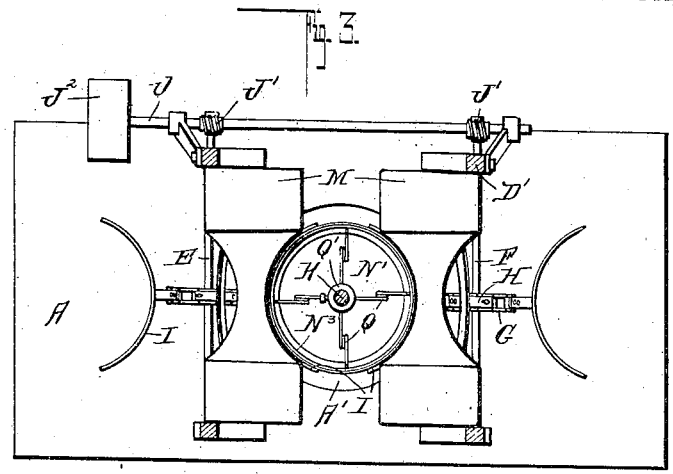
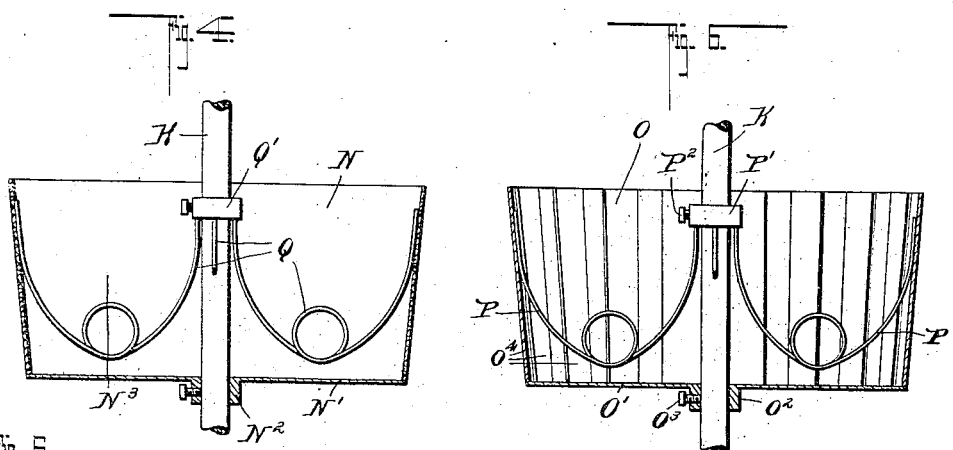
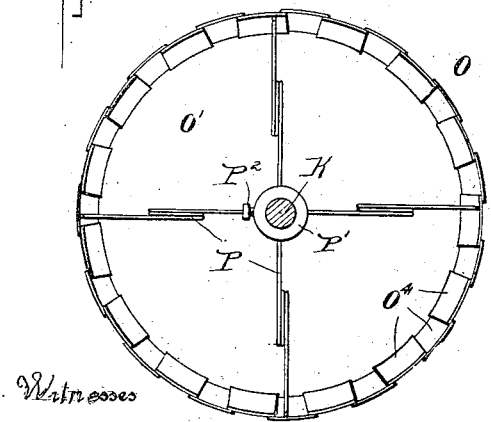
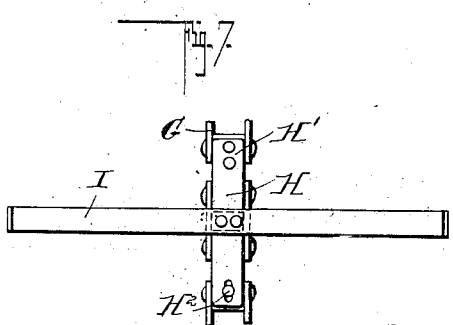
Inventor
W. Martin,

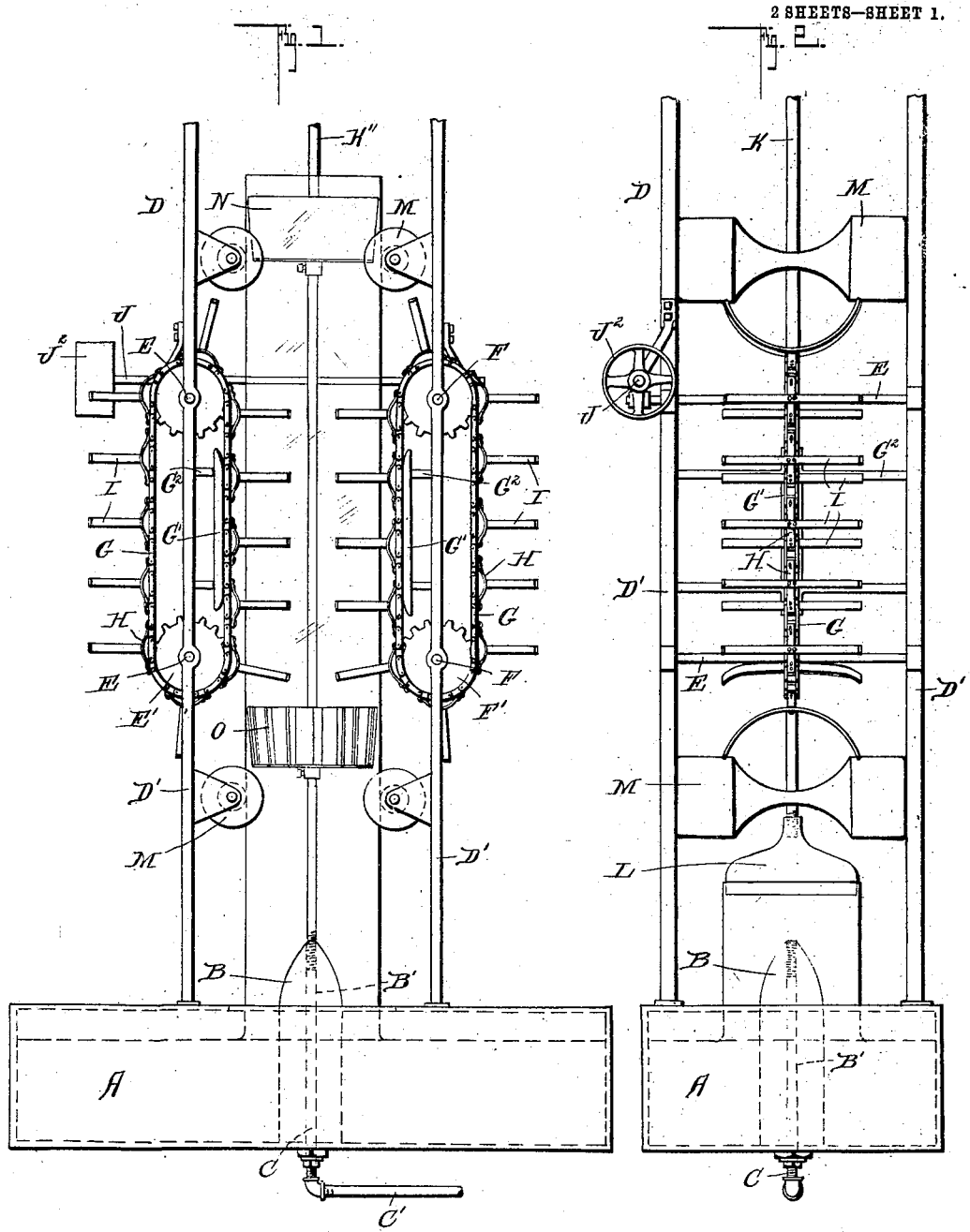

UNITED STATES PATENT OFFICE.

WILLIAM MARTIN, OF JEANNETTE, PENNSYLVANIA.

CONTINUOUS WINDOW-GLASS-DRAWING MACHINE.

969,385.    Specification of Letters Patent.    Patented Sept. 6, 1910.

Application filed September 20, 1909. Serial No. 518,593.

*To all whom it may concern:*

Be it known that I, WILLIAM MARTIN, a citizen of the United States, residing at Jeannette, in the county of Westmoreland and State of Pennsylvania, have invented a new and useful Improvement in Continuous Window-Glass-Drawing Machines, of which the following is a specification.

This invention relates to certain new and useful improvements in continuous glass drawing machines, the object being to improve the general construction whereby the cylinder can be drawn upwardly with greater ease.

A still further object of the invention is to improve the general construction of conveyer whereby the curved arms of the conveyer are so constructed that they will yield when thrown into engagement with the glass cylinder so that all danger of breaking the same is prevented.

Another object of the invention is to provide guide rollers for the cylinder so as to prevent the same from moving in any direction when being drawn upwardly.

Another object of the invention is to provide a glass drawing machine in which the air is supplied through a cone extending upwardly through the bottom of the tank.

A still further object of the invention is to improve the construction of piston whereby the same will adjust itself to the inside of the cylinder in such a manner that a perfect air tight joint will be formed.

Another object of the invention is to provide a second piston which is formed of a cork shell which is held tightly against the inner face of the cylinder by springs.

With these various objects in view, my invention consists of the novel features of construction, combination and arrangement of parts hereinafter fully described, pointed out in the claims and shown in the accompanying drawings, in which, Figure 1 is a side elevation of my improved continuous glass drawing machine showing the glass cylinder being moved upwardly by the conveyer. Fig. 2 is a side elevation taken at right angles to that of Fig. 1, showing the cylinder being started from the tank of molten glass by the nipple. Fig. 3 is a top plan view of the machine. Fig. 4 is a vertical section through the cork piston. Fig. 5 is a vertical section through the metallic piston. Fig. 6 is a top plan view of Fig. 5, and, Fig. 7 is a detail view showing the manner of connecting the arms to the chain of the endless conveyer.

In carrying out my improved invention I employ a tank A having an opening A', in its top through which extends a conical member B which is preferably formed of fire clay and is provided with a vertical bore B' in which is arranged a pipe C to which is connected an air supplying pipe C' leading from a suitable fan or pump, not shown, for supplying air to the cylinder as will be hereinafter fully described.

Extending upwardly from the top of the tank A is a frame D formed of four uprights D' arranged in pairs between which are mounted horizontal shafts E and F on which are secured sprockets E' and F' over which are mounted endless chains G of my improved conveyers which are formed of open and solid links alternately arranged, said solid links carrying spring members H to which are connected curved arms I having their faces lined with asbestos so that when the same are brought into engagement with the glass cylinder they will be protected from the heat of the same. The spring members H are fixed at one end as shown at H' and are slidably connected at their other ends as shown at H² so as to allow the same to give so that when the arms are brought into engagement with the cylinder they will yield to such an extent that all danger of the cylinder becoming broken is prevented. For holding the curved arms of the endless chain G into engagement with the sides of the glass cylinder in such a manner that all danger of the cylinder becoming broken as the arms are brought into engagement with the same, I provide tracks G' against which the inner faces of the chains are adapted to bear, said tracks being carried by arms G² extending outwardly from cross bars G³ connecting the respective uprights D'.

The upper shafts E and F extend outwardly as shown and are connected to a driving shaft J by a worm gearing J', said driving shaft being provided with a pulley J² over which is adapted to pass a driving belt operated by any suitable means and it will also be rotated so as to cause the conveyers to move upwardly in order to carry a glass cylinder which has been formed up with the same as will be hereinafter fully described.

An air pipe or piston rod K is slidably mounted in suitable bearings not shown between the conveyers and is provided with a threaded lower end on which is adapted to be secured a bait L which is lowered into the tank of molten glass over the conical member B so that when air is forced through the conical member into the cylinder will be started as the piston rod K is moved upwardly and the cylinder is drawn in the ordinary manner until it is caught by the endless conveyers.

For guiding the cylinder after being carried upwardly by the conveyers I provide the uprights with conical guide rollers M above and below the conveyers so that the cylinder will be guided in such a manner that all danger of the same wabbling or moving in any way is prevented. After the cylinder has been drawn upwardly by the conveyers the piston rod K and bait L are removed and pistons N and O are secured on a piston rod K' which is provided with a threaded lower end portion, is inserted within the glass cylinder, the threaded end being adapted to be secured in the threaded upper portion of the conical member B for holding the same in position. The piston N is formed of a metal disk O' provided with a collar O² which is locked in position on the piston rod by set screws O³ and the disk O' is provided with plates O⁴ extending upwardly therefrom which are overlapped as clearly shown in Fig. 6 and against which are adapted to bear spring members P carried by a collar P' secured in the piston rod K' by a set screw P².

While I have shown and described the spring members only bearing against a certain number of inside curved plates it is of course understood that the spring members will either carry curved plates at their free ends or a greater number of spring members will be used so that the tendency of the plates will be to move outwardly in order to completely fill the cylinder when placed therein so that an air tight joint will be formed around the same whereby the air will be held within the cylinder as it is forced through the conical member so that the cylinder can be drawn upwardly in a similar manner to glass blowing machines now in use.

To insure the complete closing of the cylinder the piston N is placed on the piston rod K' above the piston O, said piston N comprising a disk N' provided with a collar N² for locking the same in position on the piston rod and the disk is provided with a cork shell N³ which is held tightly against the inner face of the cylinder by springs Q carried by the collar Q' secured on the piston rod K and it will be seen that by this construction the cork shell will yield as the springs force the same outwardly so as to fit tightly against the inner face of the cylinder in order that the upper end will be completely closed in case that air should escape from the lower cylinder.

The operation of my improved glass blowing machine is as follows:—As shown in Fig. 2 the bait has been dropped into the tank of molten glass over the conical member and the cylinder started, as the same is drawn upwardly it passes between the conical guide rollers M and is caught by the arms of the conveyers so that the same will be drawn upwardly as the conveyers are operated. The bait and piston rod K are then removed from the cylinder thus formed and the piston rod K', provided with pistons N and O is placed in position in the cylinder as clearly shown in Fig. 1 so as to completely close the same so that as the cylinder is drawn upwardly by the conveyers the open end of the cylinder will be completely closed so as to hold the air forced into the same through the conical member therein in order that a continuous cylinder of glass will be blown, it of course being understood that the upper end of the cylinder is cracked off as the same is drawn upwardly, in the desired length to form the different sized plates of glass.

From the foregoing description it will be seen that I have provided a glass blowing machine which is exceedingly simple and cheap in construction and one in which the parts are so mounted and operated that the cylinder can be drawn upwardly and definitely without any danger of breaking the same.

What I claim is:—

1. In a continuous glass drawing machine the combination with a piston rod adapted to carry a bait for starting the cylinder, expansible pistons adapted to be placed on said piston rod and conveyers provided with yieldable arms for engaging the cylinder and drawing the same upwardly.

2. In a continuous glass drawing machine the combination with a tank having a conical air supplying member arranged therein, of a piston slidably mounted above said tank carrying a bait adapted to fit over said conical member for starting the cylinder, conveyers for drawing the cylinder upwardly and pistons mounted on said piston rod for closing the cylinder.

3. In a continuous glass drawing machine the combination with a tank provided with an air supplying member, of a piston rod mounted above said tank carrying a bait for forming a cylinder, guide rollers for guiding the cylinder, conveyers provided with yieldable curved arms for engaging the cylinder and drawing the same upwardly and spaced pistons arranged on said piston rod for closing the cylinder.

4. In a continuous glass drawing machine the combination with a tank provided with a conical air supplying member, of a slidably mounted piston rod carrying a bait for starting the cylinder, conveyers provided with yieldable arms for moving the cylinder upwardly, guide rollers for engaging the cylinder and guiding the same in its upward movement, a piston carried by said piston rod comprising a disk having a plurality of segmental curved members, extending upwardly therefrom overlapping one another and springs for forcing said segmental members outwardly.

5. In a continuous glass drawing machine the combination with a pair of endless chains, of spring members carried by the links of a chain, curved arms carried by said spring members provided with an asbestos facing and means for operating said endless chains.

6. In a continuous glass drawing machine the combination with a tank provided with a conical air supplying member, of uprights extending upwardly from said tank, horizontal shafts mounted in said uprights, sprocket wheels carried by said shafts, endless chains passing over said sprockets, spring members carried by said sprocket chains having one of their ends fixed and the other slidably connected to the links of the chain, curved arms carried by said spring members and a piston rod carrying pistons for closing the glass cylinder as the same is drawn upwardly by the curved arms.

7. In a continuous glass drawing machine the combination with means for forming a cylinder, of conveyers for drawing the cylinder upwardly after the same has been formed, a conical member arranged in the tank containing the molten glass for supplying air to the cylinder and a piston rod carrying adjustable pistons arranged within said cylinder.

WILLIAM MARTIN.

Witnesses:
 CHARLIE RESSLAR,
 E. C. CURRY.